United States Patent [19]

Erdman

[11] Patent Number: 5,526,252

[45] Date of Patent: Jun. 11, 1996

[54] UTILITY CURRENT FEEDBACK FILTER WITH PULSE-WIDTH MODULATED POWER CONVERTER

[75] Inventor: William L. Erdman, Brentwood, Calif.

[73] Assignee: Kenetech Windpower, Inc., Livermore, Calif.

[21] Appl. No.: 212,511

[22] Filed: Mar. 11, 1994

[51] Int. Cl.⁶ .................................................. H02M 7/5395
[52] U.S. Cl. ................................ 363/41; 363/97; 323/207
[58] Field of Search ..................................... 323/205, 207; 363/41, 95, 97, 98

[56] References Cited

U.S. PATENT DOCUMENTS

| 4,251,735 | 2/1981 | Coleman | 307/46 |
|---|---|---|---|
| 4,251,736 | 2/1981 | Coleman | 307/46 |
| 4,277,692 | 7/1981 | Small | 307/66 |
| 4,666,020 | 5/1987 | Watanabe | 187/114 |
| 4,700,081 | 10/1987 | Kos et al. | 290/44 |
| 4,719,550 | 1/1988 | Powell et al. | 363/37 |
| 4,780,660 | 10/1988 | Shima et al. | 323/207 |
| 4,903,184 | 2/1990 | Hirose | 363/37 |
| 4,942,511 | 7/1990 | Lipo et al. | 363/136 |
| 4,954,726 | 9/1990 | Lipman et al. | 307/46 |
| 4,994,981 | 2/1991 | Walker et al. | 364/492 |
| 5,111,058 | 5/1992 | Martin | 307/66 |
| 5,150,032 | 9/1992 | Ho | 320/14 |
| 5,172,009 | 12/1992 | Mohan | 307/46 |
| 5,187,427 | 2/1993 | Erdman | 323/207 |
| 5,241,217 | 8/1993 | Severinsky | 307/64 |
| 5,243,224 | 9/1993 | Tagney, Jr. | 290/1 |
| 5,272,429 | 12/1993 | Lipo et al. | 318/808 |

FOREIGN PATENT DOCUMENTS 56-125996  10/1981  Japan.
60-237880  11/1985  Japan.

OTHER PUBLICATIONS

Ooi, et al., "An Integrated AC Drive System Using a Controlled-Current PWM Rectifier/Inverter Link", *17th Annual IEEE Power Electronics Specialists Conference*, 1986, pp. 494–501.

Murphy, et al., "Power Electronic Control of AC Motors", *Pergamon Press*, 1988, Section 4.5 The Three-Phase Bridge PWM Inverter, pp. 123–147, and Section 7.13, Implementation of Field-Oriented Control, pp. 320–330.

Niermeyer, et al., "AC-Motor Drive with Regenerative Braking and Reduced Supply Line Distortion", *Aachen*, 1989, pp. 1921–1926.

Shoji et al., "Current Source Rectifier/Inverter System with Sinusoidal Currents", *IEEE*, 1988, pp. 909–914.

Sul, et al., "Design of an Optimal Discrete Current Regulator", *IEEE Industry Applications Society Annual Meeting, Part 1*, 1989, pp. 348–354.

Ogata, Modern Control Engineering, Prentice Hall, 1970, p. 526.

*Primary Examiner*—Peter S. Wong
*Assistant Examiner*—Adolf Berhane
*Attorney, Agent, or Firm*—Blakely, Sokoloff, Taylor & Zafman

[57] ABSTRACT

A utility feedback filter for a self-commutated, pulse-width modulated power electronic converter. A feedback node is coupled to detect the utility current which is then utilized in a feedback loop through a feedback circuit. The feedback processed utility current is summed with the requested utility current, and the difference is used to generate a pulse-width modulation pattern. The damping factor can be adjusted by the feedback circuit, which preferably has a transfer function of $K_f+K_d$, where $K_f$ is a proportional feedback gain and $K_d$ is a derivative feedback gain. Utilization of the actual utility current provides precise control of the current supplied to the utility, which substantially reduces or even eliminates the high frequency harmonic components. Furthermore, by proper choice of the components in the feedback circuit, the resistive value of a damping resistor can be decreased, thereby reducing wasteful dissipation of power.

22 Claims, 5 Drawing Sheets

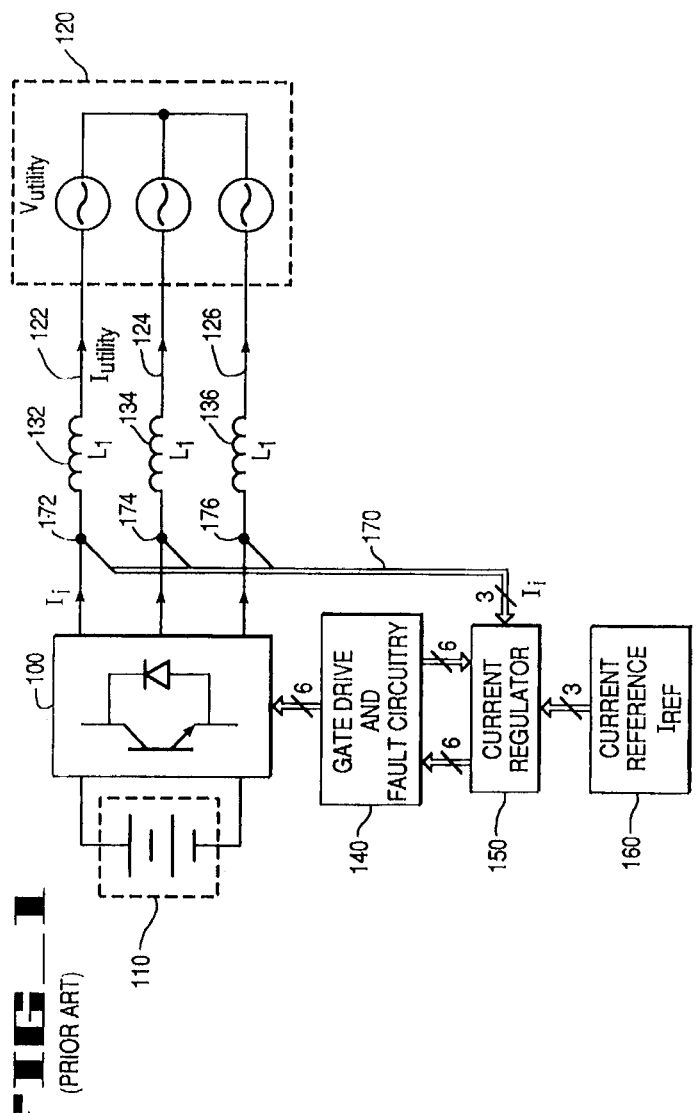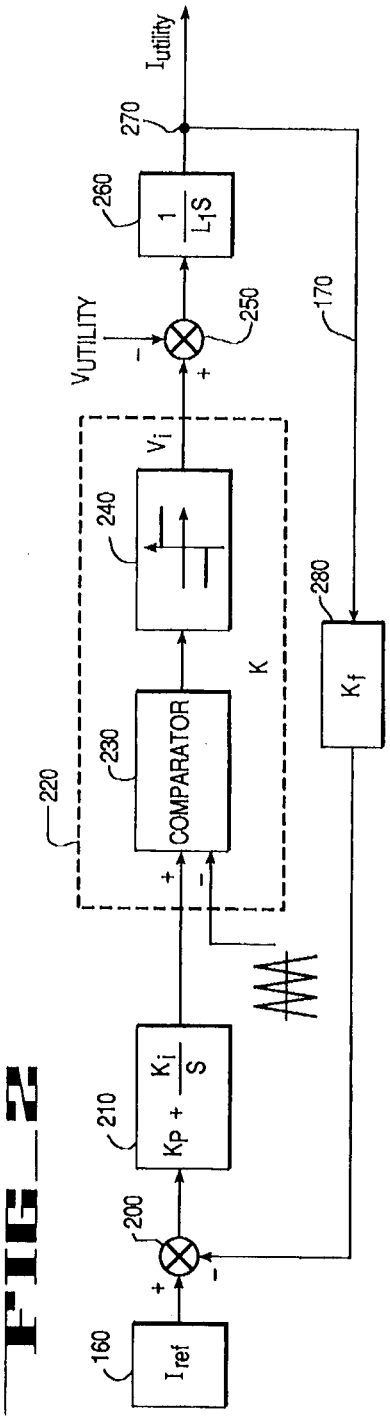
FIG_1 (PRIOR ART)
FIG_2

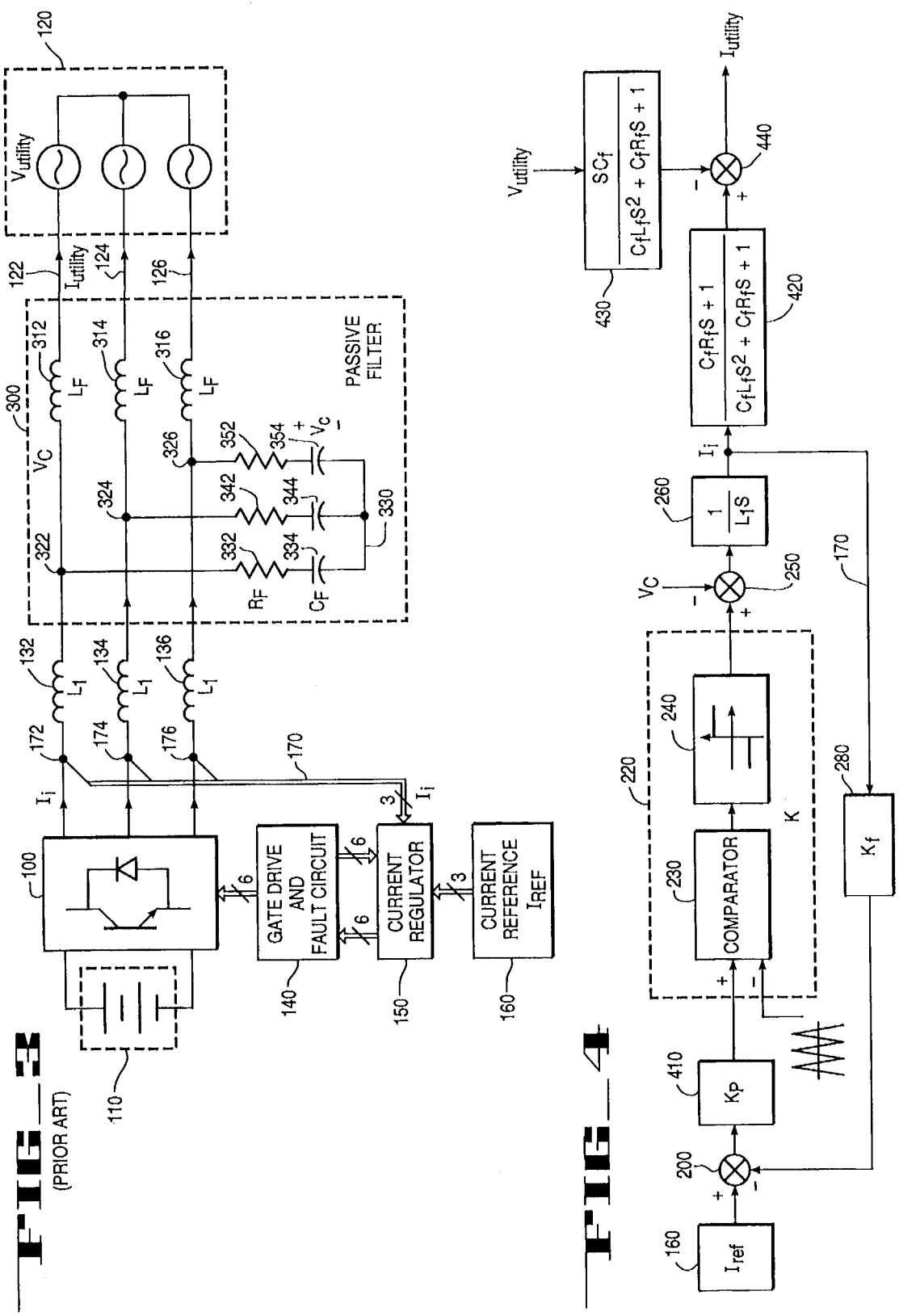

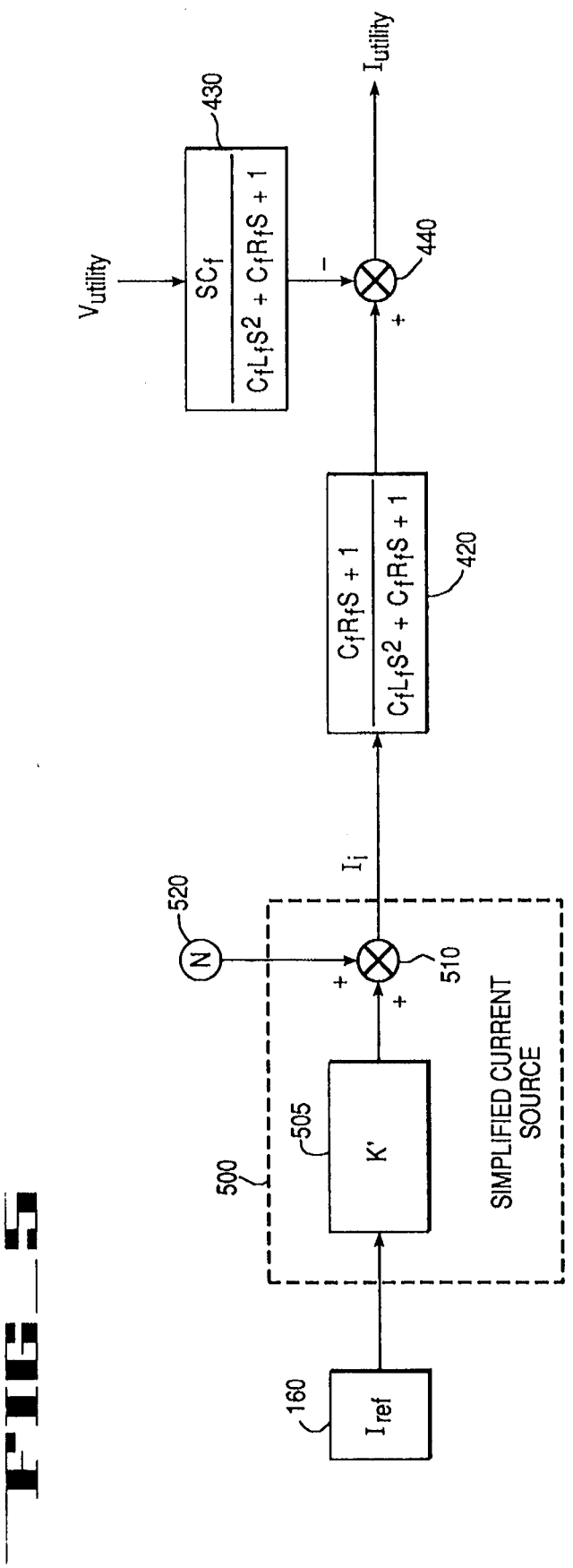
FIG_5

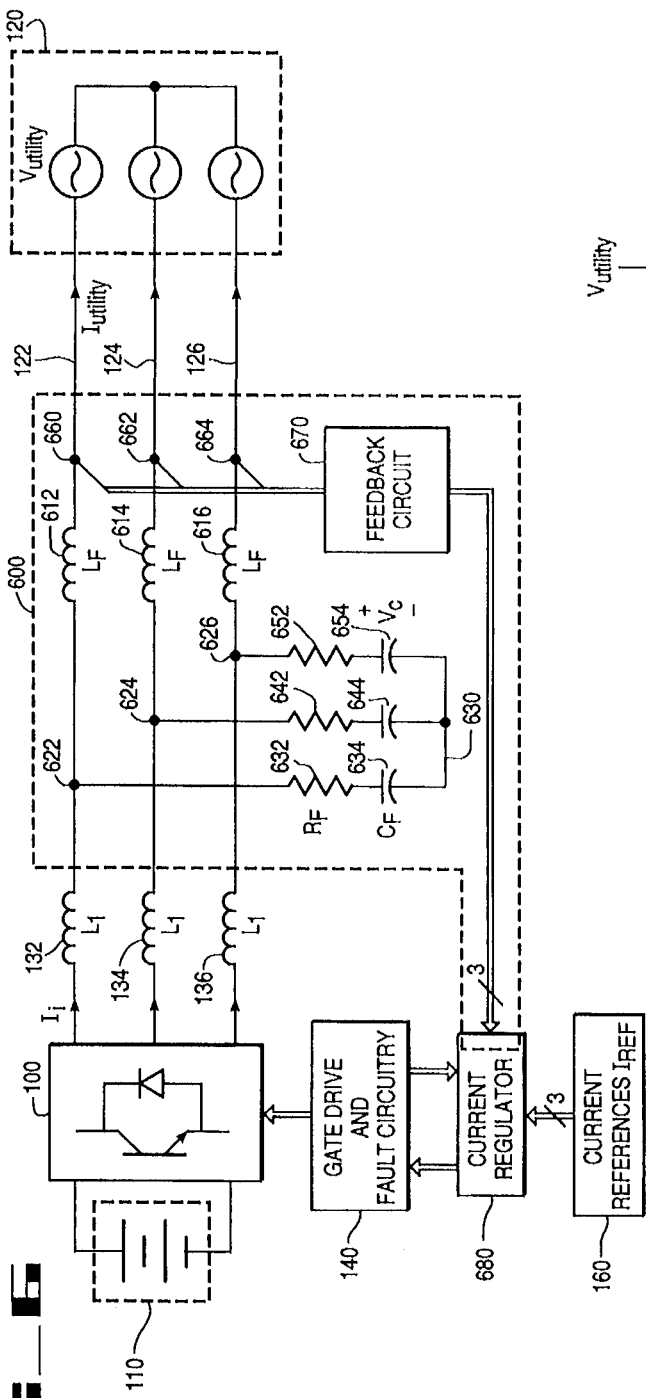
FIG_6
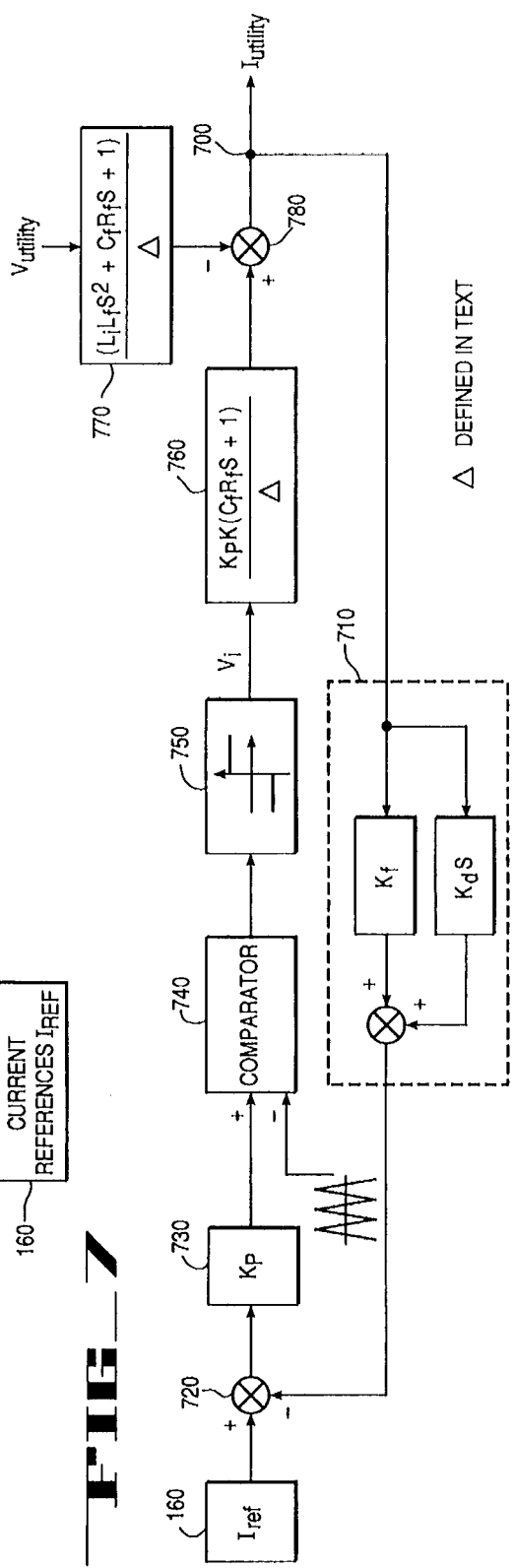
FIG_7

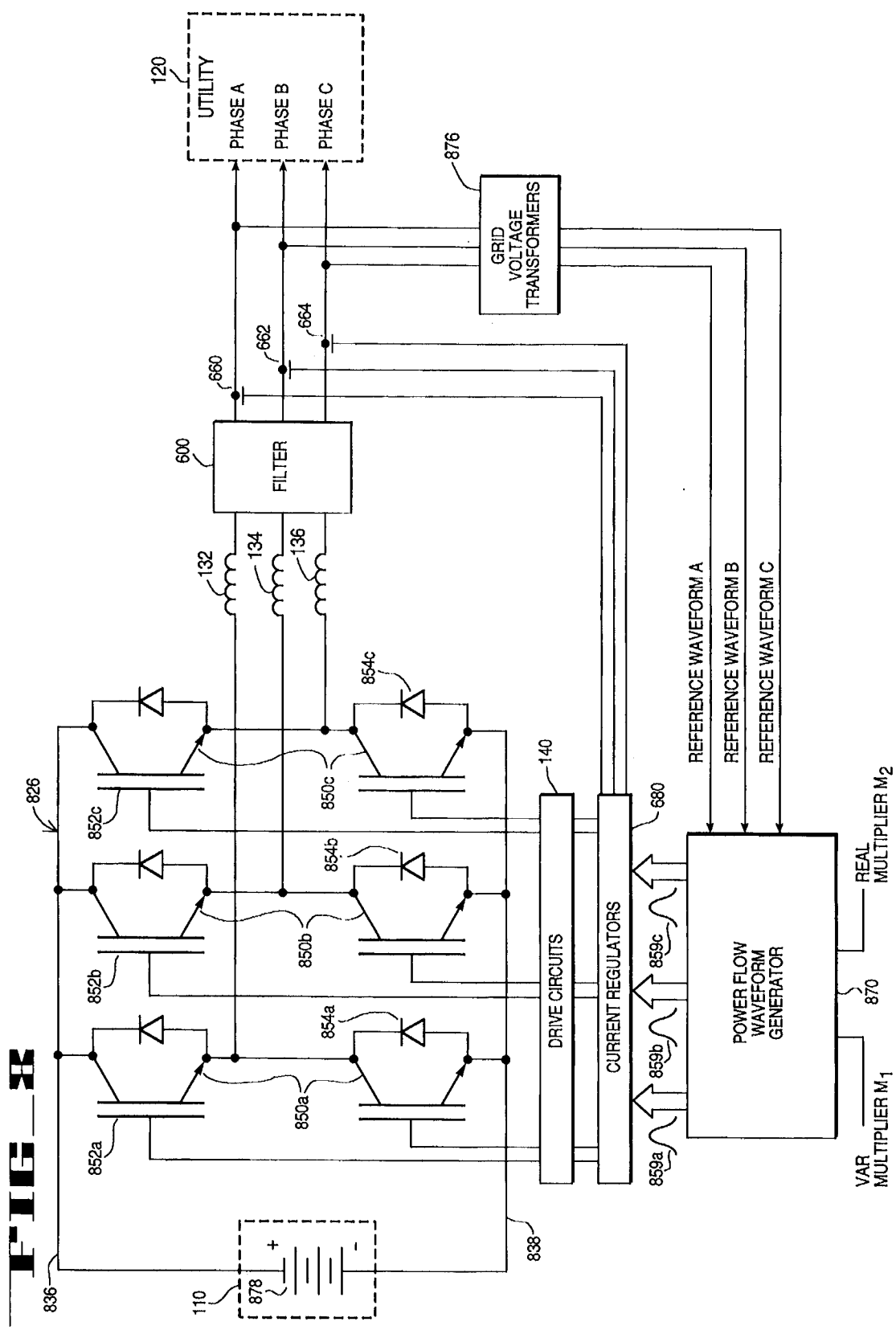

UTILITY CURRENT FEEDBACK FILTER WITH PULSE-WIDTH MODULATED POWER CONVERTER

CROSS REFERENCE TO RELATED APPLICATIONS

Cross-reference is made to the following commonly assigned patents and co-pending applications:

U.S. Pat. No. 5,187,427, issued Feb. 16, 1993, entitled "Static Reactive Power Compensator", by William L. Erdman;

U.S. Pat. No. 5,225,712, issued Jul. 6, 1993, entitled "Variable Speed Wind Turbine with Reduced Power Fluctuation and a Static VAR Mode of Operation", by William L. Erdman; and Ser. No. 07/986,798, filed Dec. 8, 1992, entitled "A Controlled Electrical Energy Storage Apparatus for Utility Grids" by William L. Erdman.

BACKGROUND OF THE INVENTION

1. Field of the Invention

This invention relates generally to pulse-width modulated, current regulated utility interface converters. More particularly, the present invention relates to control of the pulse-width modulated converter to provide a utility current wave form with low harmonic content, variable power factor, and efficient energy conversion.

2. Description of Related Art

Utility interface power electronic converters are commonly utilized to exchange electrical energy between an AC source, such as a utility, and DC source, or DC load. Conventional power electronic converters use power switching devices such as a silicon controlled rectifier in a line commutated converter topology. In recent years, the conversion function has been accomplished by the use of more advanced devices, such as power transistors, gate-turn-off thyristors, metal-oxide-field-effect-transistors, or other gate controlled devices in a self commutated, pulse-width modulated converter topology. These later converters represent an improvement in cost as they inherently can pass electrical energy bi-directionally, i.e. from AC to DC or from DC to AC, and can eliminate the high magnitude, low frequency harmonic currents associated with line commutated converters. However, one drawback of the pulse-width-modulated converter is the generation of high frequency harmonic currents which are at, or near, the converter switching frequency. These harmonic currents interact with utility system impedances and distort the utility voltage leading to potential disturbance problems for other sensitive equipment which may be connected to the utility. Because of this and related problems, the need to reduce or eliminate high frequency harmonic currents is well recognized.

Traditional approaches to mitigating harmonic current problems include installation of passive element power line filters. Although such passive filters can reduce harmonic content, they have undesirable side effects associated with them, most notably the addition of pure capacitance on the line which can interact with normal utility system distributed inductances resulting in resonant modes. If any equipment on the utility excites the inductive-capacitive network at its resonant frequency, then utility system instability can result. To eliminate this possibility, it is necessary to add resistance to the capacitive network to provide damping at the resonant frequency. However, the addition of resistance to the network has the negative side effect of considerable losses, the extent of which depends on converter size but can easily be in the two-to-three kilowatt (or larger) range. Also, because the filter principally has a capacitive reactive nature, voltage harmonics present in the utility, such as harmonics produced as a by-product of power generation, result in additional filter induced utility harmonic currents at the voltage harmonic frequencies.

In more recent years, active power filters have been proposed which electronically compensate for low frequency harmonics, such as $5^{th}$, $7^{th}$, $11^{th}$ and $13^{th}$ harmonics generated by line-commutated converters. One such active filter includes a self-commutated pulse-width-modulated converter coupled in parallel with the line-commutated converter. These active filters are incapable of filtering the high frequency components generated by self-commutated, pulse-width-modulated converters, and in fact, since these are self-commutated converters in and of themselves, they introduce high frequency components by their application.

It would be advantageous to provide a power filter that more effectively reduces the high frequency harmonic currents generated by self-commutated converters, thereby providing a more acceptable power converter configuration for connection to the utility. It would also be an advantage to provide a power filter which can substantially reduce, or eliminate, the need for the large damping resistor, thereby reducing the losses in the filter. Such a power line filter would provide low harmonic current content to the utility and would have high efficiency for effective electrical energy transfer.

SUMMARY OF THE INVENTION

The present invention provides a utility feedback filter for a self-commutated, pulse-width-modulated power electronic converter that allows precise control of the current supplied to the utility, thereby providing a means to reduce or eliminate the high frequency harmonic currents supplied to the utility grid. Furthermore, the utility feedback filter substantially reduces, or even eliminates, the filter's resistors, thereby substantially reducing power losses and providing more efficient operation.

The present invention provides the above advantages by including, as feedback, the actual utility current rather than the converter current. The utility current is then processed through a feedback element to provide a processed utility current which is then summed with the requested utility current, and the difference is used to generate the pulse-width modulation pattern. Since the feedback loop in the converter is closed with the utility current, it is utility current which is directly controlled.

The system has a damping factor that can be adjusted by the feedback element. Preferably, the feedback element has the transfer function $K_f + K_d S$, where $K_f$ is the proportional feedback gain and $K_d$ is the derivative feedback gain. Increasing either or both of $K_d$ and $K_f$ will increase the damping factor. The increased damping factor allows the resistive value $R_f$ of the damping resistor to be reduced, thereby reducing wasteful dissipation of power.

The utility feedback filter is useful in any application which requires interfacing a DC source or load with a utility. Examples of such applications include variable speed wind turbines, stored energy systems such as battery storage devices, photo-voltaic systems, DC power supplies, and adjustable speed drive systems. The filter together with the pulse-width-modulated converter can be used to supply reactive power to a utility system as well, and is useful, therefore, in static VAR compensation equipment.

In the described embodiment, the utility feedback filter requires a power converter which includes a switching circuit including a plurality of high speed electrical switches that are arranged in pairs. Each switch pair is coupled between one of the phase lines of the converter and the DC source or load. The switch pairs are controlled by pulse-width modulation at a high frequency to directly control instantaneous currents flowing in the phase connections at the converter, which are related to the utility phase currents. The switches are controlled by current regulators which monitor the utility current and select a pulse pattern based upon the desired and the actual utility currents.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instruction purpose, and therefore resort to the claims if necessary to determine the inventive subject matter.

BRIEF DESCRIPTION OF THE DRAWINGS

FIG. 1 is a circuit diagram illustrating a conventional converter having a conventional feedback node using converter current feedback, with an inductive filter.

FIG. 2 is a mathematical representation of the converter circuit of FIG. 1.

FIG. 3 is a circuit diagram of a power electronic converter using converter current feedback and a passive filter coupled between it and a utility source of AC electrical energy.

FIG. 4 is a mathematical representation of the converter circuit of FIG. 3, which includes a passive filter.

FIG. 5 is a simplified mathematical representation of FIG. 4, where the converter and converter feedback are modeled as a current source with a passive filter.

FIG. 6 is a block circuit diagram of a converter with the utility current feedback filter.

FIG. 7 is a mathematical representation of the converter and the utility current feedback filter.

FIG. 8 is a schematic diagram of a preferred embodiment of the pulse-width modulated converter and utility current feedback filter.

DETAILED DESCRIPTION OF THE INVENTION

FIGS. 1 through 8 of the drawings disclose various embodiments of the present invention for purposes of illustration only. One skilled in the art will readily recognize from the following discussion that alternative embodiments of the structures and methods illustrated herein may be employed without departing from the principles of the invention.

Reference is made to FIG. 1, which is a prior art system for controlling a power electronic converter. The power electronic converter 100 includes a plurality of semiconductor switches including a transistor and an opposed, freewheeling diode connected in a parallel configuration. An example of the power electronic converter circuit 100 is illustrated in FIG. 8, and includes a plurality of switch pairs, each switch pair controlling the current flow for one phase. The switching circuit 100 is coupled between a DC source 110 and a three-phase utility source 120. A utility is defined as any three-phase power source capable of providing or absorbing energy. The three-phase utility lines include a phase A line 122, a phase B line 124, and a phase C line 126. Each phase line 122–126 includes an inductor coupled in series between the converter 100 and the AC source 120. Particularly, a first converter inductor 132 is coupled between the converter 100 and the phase A line 122, a second converter inductor 134 is coupled between the converter 100 and the phase B line 124, and a third converter inductor 136 is coupled between the converter 100 and the phase C line 126. Each converter inductor 132–136 preferably has the same inductive value $L_1$.

A gate drive and fault circuitry 140, including conventional drive circuits, is coupled to the converter 100 in order to drive the switches in accordance with signals received from a three phase current regulator 150. The current regulator 150 receives a three phase current reference signal $I_{ref}$, illustrated at 160, and three phase current feedback signals 170 coupled to a node between the converter 100 and the converter inductors 132, 134, and 136. Particularly, the three phase current feedback signals 170 include a first current signal supplied from a first node 172, a second current signal supplied from a second node 174, and a third current signal supplied from a third node 176.

The three-phase reference current $I_{ref}$ is supplied by any source, such as the source described in U.S. Pat. No. 5,187,427, issued Feb. 16, 1993, entitled "Static Reactive Power Compensator", by William L. Erdman, which is incorporated by reference herein. The current regulator 150 includes conventional circuitry, responsive to the reference currents $I_{ref}$ and the current feedback signals 170 to control the converter 100 to output currents consistent with reference currents $I_{ref}$ therefrom. Particularly, the current regulator 150 includes conventional circuitry for pulse-width modulation CPWM") of the converter 100. Preferably, such pulse-width modulation circuitry includes circuitry to implement a hard-switched PWM converter. However, the current regulator 150, in other embodiments, could include circuitry to implement other PWM techniques, such as a pulse coded modulation ("PCM") system for resonant converters. In such a PCM system, the converter 100 would include an LC resonant circuit positioned in the DC link to the DC source 110.

Reference is now made to FIG. 2, which is a mathematical representation of a single phase of the prior art circuit of FIG. 1. It should be apparent that the representation will be repeated for each phase. The current reference $I_{ref}$ 160 is applied to a summing junction 200, in which it is summed with a feedback current signal 170 that is processed by a multiplicative gain $K_p$, illustrated in a box 280. The output from the summing element 200 is supplied to a first processing element 210 that is a proportional plus integral controller according to the relation $K_p + K_i/s$ The output of the element 210 is applied to an element 220, that includes a comparator 230 and a switching inverter represented by an element 240. In mathematical terms, this can be represented by a gain K. The output signal is summed with one phase of the utility voltage at summing junction 250. The difference between the voltages is processed by an inductive impedance element 260, which is implemented by one of the converter inductors 132–136. The output of the impedance element 260 is the utility current $I_{utility}$. The feedback coupling node 270 supplies current feedback through the feedback line 170 to the multiplicative circuit element 280 whose output is coupled to the summing junction 200.

The closed loop transfer function of the representation of FIG. 2 is represented by the following equation:

$$I_{utility} = \frac{(K_p S + K_I) K I_{ref} - S V_{utility}}{L_1 S^2 + K_f K_p K S + K_f K_I K} \quad (1)$$

where "S" is the Laplacian operation, and the other variables are defined above and in the appendix.

The damping factor is the first order term in the denominator of the above second order closed loop transfer function:

Damping Factor=$K_f K_p K$

The damping factor can be selected in software and/or in circuit elements to provide stability, which is one advantage of the above described system. Another advantage of the above system is that it is substantially insensitive to structural changes like variations in values of the inductor, or changes in the utility voltage. A third advantage is direct control of the utility current because the converter current is fed back and the converter current $I_t$ is equal to the utility current $I_{utility}$. However, one disadvantage of the above system is the high frequency harmonic content in the utility current. In order to address this disadvantage, a passive filter may be added, in accordance with the following discussion.

Reference is now made to FIG. 3, which is a diagram of a power converter circuit including a passive filter. As in FIG. 1, the system includes a converter 100 coupled between a DC source 110 and a utility source 120. The system also includes the gate drive and fault circuitry 140 coupled to the converter 100, and current regulators 150 coupled to the gate drive and fault circuitry 140. The three-phase current reference signal $I_{ref}$ is supplied from the box 160 to the current regulator 150 to set the instantaneous current flow of the converter 100. The feedback line 170 couples the current regulators 150 to feedback nodes 172–176 between the converter and inductors 132–136 to supply current feedback signals to the current regulators 150.

A passive filter 300 is coupled between the converter inductors 132–136 and the AC source 120. Particularly, the passive filter 300 includes a first filter inductor 312 coupled in series between the converter inductor 132 and the phase A line 122 of the AC source 120. A second filter inductor 314 is coupled between the second converter inductor 134 and the phase B line 124. Likewise, a third filter inductor 316 is coupled between the third converter inductor 136 and the phase C line 126. Each filter inductor 312–316 has an inductance value $L_f$ which, typically is equivalent to the inductance value $L_1$.

A first filter node 322 is defined between the first converter inductor 132 and the first filter inductor 312, a second node 324 is defined between the second converter inductor 134 and the second filter inductor 314, and a third filter node 326 is defined between the third conductor inductor 136 and the third filter inductor 316. A common node 330 is used to form a filter neutral point. A first filter resistor 332 and a first filter capacitor 334 are coupled in series between the first node 322 and the common node 330. A second filter resistor 342 and a second filter capacitor 344 are coupled in series between the second node 324 and the common node 330. A third filter resistor 352 and a third filter capacitor 354 are coupled in series between the third node 326 and the common node 330. A voltage $V_c$ is defined as the per-phase capacitor voltage across the filter capacitors 334, 344, 354.

FIG. 4 is a mathematical representation of a single phase of the converter with the passive filter illustrated in FIG. 3. It should be apparent that the representation is duplicated for each phase. Many of the elements in the mathematical representation are the same as in FIG. 2. However, the element 410 that receives the sum of the current reference $I_{ref}$ and the processed feedback signal includes the transfer function of $K_p$, rather than the proportional plus integral $$\left( K_p + \frac{K_I}{S} \right)$$

controller illustrated previously with respect to the element 210. In some embodiments, the proportional plus integral controller shown in FIG. 2 could be utilized in the representation of FIG. 4. However, the mathematics which illustrate the transfer function and the effect of the filter is greatly simplified by using a simple proportional controller as illustrated by the element 410. The filter's effect is illustrated in FIG. 4 by the element 420 and element 430. The effect of the utility voltage ($V_{utility}$) by the filter is mathematically represented by the element 430. The resulting utility current is then determined from the filter's effect on the inverter current $I_t$ at 420 and the effect of the utility voltage as shown by a summing junction 440.

FIG. 5 is a simplified mathematical representation of FIG. 4. In this simplified representation, a box 500 is a current source with the fundamental converter current being represented by constant gain box 505 having a gain K'. The output of the gain box 505 is summed in summing junction 510 with the noise term 520, which represents the converter-generated current harmonic components. The effect of the filter is as before illustrated in the elements 420 and 430, which is applied to the summing junction 440. FIG. 5 is an accurate simplification of FIG. 4, because the current feedback of the converter current $I_t$ with the converter inductors 132–136 allows the PWM modulator and the converter inductors 132–136 to be modeled as a current source including a fundamental component from the box 505 and a harmonic component represented as "N" from the box 520. The gain term K'505 represents the closed loop gain from FIG. 4.

The resulting closed loop transfer function from FIG. 5 is given as:

$$I_{utility} = \frac{C_f R_f S + 1}{C_f L_f S^2 + C_f R_f S + 1} I_t - \frac{S C_f}{C_f L_f S^2 + C_f R_f S + 1} V_{utility} \quad (2)$$

where $I_t = \frac{K_p K I_{ref} + N}{1 + K_p K K_f}$

One advantage of the passive filter is simplicity: the passive filter can be coupled between the converter and the utility with no loss of stability in the converter currents. Furthermore, the passive filter 300 eliminates converter-generated high frequency current components from the utility current. However, disadvantages of this passive filter are illustrated with reference to the position of the feedback nodes 172–176 of FIG. 3. Particularly, it can be seen that, at those places, the current to the AC source 120 is only indirectly known, which means that the use of the feedback nodes 172–176 to control current only indirectly controls currents to the utility. In other words, using converter feedback, the current at the converter is directly controlled, but this output is filtered, and the filter introduces effects that cause the utility current to be different in magnitude and phase than the desired current requested by $I_{ref}$. Furthermore, the filter 300 can draw harmonic currents due to utility generated harmonic voltages which cannot be corrected by the converter 100. Additionally, to provide a desired power factor, a phase shift caused by the passive filter 300 must be accounted for by the control algorithm for the pulse-width modulation system, which makes the system more complex than it would be if utility currents were directly controlled. Also the damping resistors 332, 342, and 352 have relatively large values, which cause large power losses and a resulting loss of efficiency. From the transfer function of the filter 300, it can be seen that the damping of this filter is determined by the first order term $C_f R_f S$. Since $C_f$ is determined by the filter's cut-off frequency, the damping resistor's value $R_f$ is the only variable term which can control the damping of the filter system. The value $R_f$ must therefore be relatively large to provide sufficient damping.

Reference is now made to FIG. 6, which is a diagram of a converter including the utility current feedback filter circuit. As in previous figures, a converter 100 is coupled between a DC source 110 and an AC source 120. Gate drive and fault circuitry 140 is provided to drive the converter 100, and a current reference 160 is supplied. Converter inductors 132–136 are provided and coupled to the outputs of each phase line from the converter 100. The utility current feedback filter 600 includes a first filter inductor 612 coupled between a phase A line 122 and the first converter inductor 132. A second filter inductor 614 is coupled between the phase B line 124 and the second converter inductor 134, and a third filter inductor 616 is coupled between the phase C line 126 and the third converter inductor 136. The filter inductors 612–616 each have an inductance value $L_f$ which is typically although not necessarily, equivalent to the inductances $L_1$ of the converter inductors 132–136.

A first filter node 622 is defined between the first converter inductor 132 and the first filter inductor 612, a second filter node 624 is defined between the second converter inductor 134 and the second filter inductor 614, and a third node 626 is defined between the third converter inductor 136 and the third filter inductor 616. A common node 630 is used to form a filter neutral point. A first damping resistor 632 and a first capacitor 634 are coupled in series between the first node 622 and the common node 630. A second damping resistor 642 and a second capacitor 644 are coupled in series between the second node 624 and the common node 630. A third damping resistor 652 and a third capacitor 654 are coupled in series between the third node 626 and the common node 630.

A first utility current feedback node 660 is coupled to the phase A line 122 between the first filter inductor 612 and the phase A line 122 of the AC source 120. Likewise, a second utility current feedback node 662 is coupled between the second filter inductor 614 and the phase B line 124 of the AC source 120. A third utility current feedback node 664 is coupled between the third filter inductor 616 and the phase C line 126 of the AC source 120. Each of the three utility current feedback nodes is coupled to a feedback circuit 670 that processes the current from each feedback signal in accordance with the following relation: $K_f + K_d S$, where $K_f$ is a proportional feedback term and $K_d$ is a derivative feedback term, chosen to provide characteristics such as stability and reduced harmonic content, as will be described. The summed output provides utility current feedback to a current regulator circuit 680, which may include similar circuitry to the current regulators previously described at 150 (FIG. 1). It has been found particularly useful to use a circuit element 730 that has a proportional gain $K_p$ and a triangular crossing comparator 740 to regulate the current as will be described in more detail.

Reference is now made to FIG. 7 which is a mathematical representation of a single phase of the converter circuit including the utility current feedback filter illustrated in FIG. 6. The utility current feedback nodes 660–664 are illustrated at a node 700. The feedback circuit 670 is represented by an element 710 coupled to the feedback node 700. The output from the feedback node 700 is a feedback signal that is applied to the element 710 to provide a processed feedback signal to a summing element 720, where it is combined with the reference current, $I_{ref}$ 160. The summed signal is then applied to a controller 730, and then to a comparator 740 wherein the signal is compared with a triangle wave. In the converter represented in element 750, the output voltage $V_i$ is utilized to control the currents in accordance with the control signal from the comparator 740. Since the converter current is not feedback in this filter, the converter output is a voltage source, $V_i$. The effect of the filter on inverter voltage $V_i$ is represented by the element 760, and the effect of the filter on the utility voltage is shown by the element 770. The effects of the elements 760 and 770 are combined by the summing junction 780 resulting in the utility current. The transfer function of the closed loop system is given by:

$$I_{utility} = \frac{AI_{ref} - BV_{utility}}{PS^3 + QS^2 + RS + K_p K_f K} \quad (3)$$

where $A = K_p K(C_f R_f S + 1)$ $B = (L_1 C_f S^2 + C_f R_f S + 1)$ $P = L_1 L_f C_f$ $Q = [(L_1 + L_f) + K_p K_d K] C_f R_f$ $R = [(L_1 + L_f) + K_p K(C_f R_f K_f + K_d)]$ It can be seen that this is a third order system. To determine the damping factor for the third order system, it is necessary to factor the system into the product of a first order system and a second order system. The damping factor is then determined by the damping term in the factored second order system. From this process it can be shown that the damping factor is given by:

$$\text{Damping Factor} = \frac{[(L_1 + L_f) + K_p K(C_f R_f K_f + K_d)]}{L_1 L_f C_f} \quad (4)$$

Since $L_1$, $L_f$, $K_p$, and $K$ are fixed by system requirements, the term $C_f R_f K_f + K_d$ is available to adjust system damping.

From this term, it can be seen that the damping factor can be increased by increasing the damping resistor's value $R_f$, as in the passive filter case or by increasing the derivative term $K_d$. If $K_d$ is increased to maintain a well-damped system, the resistor value $R_f$ can be made small, substantially reducing power losses.

Although the proportional feedback term $K_f$ is generally set by system requirements, in some systems $K_f$ could be increased, thereby allowing $R_f$ to be decreased. Similarly, in some embodiments $C_f$ could be increased and $R_f$ decreased accordingly.

Advantages of this system include direct regulation of the current to the AC source, thereby simplifying power factor control, in part because there is only negligible phase shift between the reference currents and utility currents. Furthermore, the undesirable, high frequency harmonic current components generated by the converter are substantially eliminated from the utility current to the AC source 120.

Reference is now made to FIG. 8, which is a schematic diagram of the converter 100, and associated circuit elements. The converter 100 includes the switching circuits shown generally at 826. The illustrated embodiment is useful for a three-phase power conversion system; in embodiments which have a different number of phases, the circuit can be easily modified accordingly as will be apparent.

The switching circuits 826 include three switch pairs, one for each of the three phases, including a phase A switch pair 850a, a phase B switch pair 850b, and a phase C switch pair 850c. Each switch pair 850a–c includes respectively an upper switch 852a–c positioned between a+DC rail 836 and its respective phase line, and a lower switch 854a–c connected between a –DC rail 838 and its respective phase line. As is known in the art, the switches 852a–c and 854a–c are operated in complementary fashion; only one of the switches in a pair will be conducting at any point in time during operation of the switching circuit 826.

The switches 852a–c and 854a–c of the converter 100 may comprise any of a number of different types of conventional active switches, including insulated gate bipolar transistors (IGBT's), bipolar junction transistors (BJT's), field effect transistors (FET's) or transistors in a Darlington configuration. Each switch 852a–c, 854a–c may include only a single transistor, or in other embodiments they may include multiple transistors connected in parallel or in any other conventional configuration. A freewheeling diode is connected in an inverse parallel relationship with each transistor in each switch 852a–c, 854a–c. In the preferred embodiment, the switches 852a–c, 854a–c and the switching circuits 100 are IGBTs.

Each switch pair 850a–c is driven by the drive circuits 140, which are controlled by current regulators 680, previously described with reference to FIG. 6. The current regulators 680 are coupled, as previously described, for example with reference to FIG. 6, to node 660, 662, and 664, each of which include a current sensor for sensing the current on that particular phase and supplying a value to the current regulators 680. As illustrated and previously described with reference to FIG. 6, for example, the nodes 660, 662, and 664 are coupled to the utility 120, and directly measure utility currents supplied from the filter 600. A power flow waveform generator 870 generates the three phase reference current 859a–c for each phase of the output power. The current reference $I_{ref}$, illustrated as 160 in FIG. 1, is illustrated in FIG. 8 as the control waveforms 859a, 859b, and 859c from the power flow waveform generator 870. Each reference current 859a–c is supplied from a power flow waveform generator illustrated at 870. The circuitry for the power flow waveform generator 870 is described in more detail in U.S. Pat. No. 5,187,427, issued Feb. 16, 1993, entitled "Static Reactive Power Compensator", by William L. Erdman, which is incorporated by reference herein. The inputs into the power flow waveform generator include a VAR multiplier $M_1$, a real multiplier $M_2$, and three voltage reference waveforms that are taken from the utility grid 120. Particularly, a plurality of grid transformers illustrated at 876 are coupled to each phase of the utility 120 in order to supply voltage reference waveforms to the power flow waveform generator 870. Within the power flow waveform generator 870, the voltage reference waveform for each respective phase is utilized to provide the respective waveform 859a–c to the current regulator 680. For example, the reference waveform A is utilized within the power flow waveform generator 870 to provide a first current reference 859a. In the preferred embodiment, the power flow control waveforms 859a–c are produced digitally at a rate between 8 KHz and 16 KHz, which means that the sample period for the control waveforms 859a–c is between 62.5 μsec and 125 μsec.

As illustrated in FIG. 8, the DC source 110 includes a battery 878 to represent an ideal DC source. Other energy storage means may be substituted for the battery 878. A large energy storage device is advantageous as this best approximates an ideal voltage source.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

APPENDIX A $L_1$ : inductance of converter inductors
$I_{ref}$ : three-phase reference current supplied to the converter
$K_p$ : proportional gain
$K_i$ : integral gain
S : Laplacian operator
K : gain term
$V_{utility}$ : utility voltage
$I_{utility}$ : utility current
$K_f$ : proportional gain of feedback circuit
$L_f$ : inductance of filter inductors
$R_f$ : resistive value of filter resistors
$C_f$ : capacitance value of filter capacitors
N : harmonic content (noise) generated by the converter
$K_d$ : derivative multiplier for feedback circuit element

What is claimed is:

1. A power flow control apparatus coupled between an AC source of electrical energy and a DC source of electrical energy, said power flow control apparatus comprising:

a power electronic converter coupled to the DC source and including a plurality of switches;

a pulse-width modulation system coupled to the power electronic converter to control said plurality of switches to supply a power flow in accordance with a power flow control waveform responsive to a current reference signal;

a passive filter coupled between said power electronic converter and said AC source;

for individual phases of the AC source a current feedback sensor positioned at a feedback node between said passive filter and said AC source to supply a feedback signal, a feedback circuit coupled to receive said feedback signal, said feedback circuit processing said feedback signal to supply a processed feedback signal, and a summing circuit coupled to receive said processed feedback signal and the current reference signal, which is applied to said pulse-width modulation system, to produce a summed signal that controls said power electronic converter.

2. The apparatus of claim 1, wherein said pulse-width modulation system comprises:

a gain circuit coupled to receive said summed signal; and a comparator circuit coupled to receive the output of the gain circuit, said comparator also having an input receiving a triangle wave, to produce a comparison output that is supplied to said power electronic converter.

3. The apparatus of claim 1 wherein said feedback circuit processes said feedback signal with a derivative gain ($K_d$), so that the feedback circuit processes the feedback signal in accordance with the relation $K_d S$, where S comprises a Laplacian operator.

4. The apparatus of claim 1 wherein said feedback circuit further processes said feedback signal with a proportional gain ($K_f$), so that the feedback circuit processes the feedback signal in accordance with the relation $K_f+K_dS$, where S comprises a Laplacian operator and $K_d$ comprises a derivative gain multiplier.

5. The apparatus of claim 1, wherein said passive filter comprises, for each phase:
   a filter inductor coupled in series between said power electronic converter and said AC source.

6. The apparatus of claim 5 wherein said passive filter further comprises, for each phase:
   a filter resistor coupled in series with a filter capacitor between a node defined between said power electronic converter and said filter inductor, and a common node.

7. A power flow control apparatus comprising:
   a power electronic converter including a plurality of switches;
   a current reference generator that generates a current reference signal;
   a pulse-width modulation system responsive to said current reference signal for controlling said power electronic converter to supply an alternating current flow therethrough;
   a utility current feedback filter for controlling said power electronic converter to reduce the harmonic currents experienced during power conversion in said power electronic converter, said utility current feedback filter including
   a passive filter coupled between said power electronic converter and said AC source;
   for individual phases of the AC source
      a current feedback sensor positioned at a feedback node between said passive filter and said AC source to supply a feedback signal,
      a feedback circuit coupled to receive said feedback signal, said feedback circuit processing said feedback signal in accordance with the relation, $K_f+K_dS$, to supply a processed feedback signal, wherein ($K_f$) comprises a proportional gain, $K_d$ comprises a derivative gain, and S comprises a Laplacian operator, and
      a summing circuit coupled to receive said processed feedback signal and the current reference signal, to generate a summed signal which is applied to said pulse-width modulation system and said converter in order to control said converter.

8. The apparatus of claim 7, wherein said pulse-width modulation system comprises:
   a gain circuit coupled to receive said summed signal; and
   a comparator circuit coupled to receive the output of the gain circuit, said comparator also having an input receiving a triangle wave, to produce a comparison output that is supplied to said power electronic converter.

9. The apparatus of claim 7, wherein said passive filter comprises, for each phase:
   a filter inductor coupled in series between said power electronic converter and said AC source.

10. The apparatus of claim 9 wherein said passive filter further comprises, for each phase:
    a filter resistor coupled in series with a filter capacitor between a node defined between said power electronic converter and said filter inductor, and a common node.

11. A method of filtering comprising the steps of:
    a) for each phase of an AC source, receiving a feedback signal indicative of utility current from a feedback node coupled between a passive filter and the AC source;
    b) for each phase of an AC source, processing said feedback signal in a feedback processing circuit; and
    c) for each phase of an AC source, applying said processed feedback signal and a preselected reference current to a pulse-width modulated power electronic converter to supply a filtered AC current.

12. The method of claim 11, wherein said step b) includes processing said feedback signal with a derivative gain ($K_d$), so that said feedback processing circuit operates according to the relation $K_dS$, where S comprises a Laplacian operator.

13. The method of claim 11, wherein said step b) processes said feedback signal with a proportional gain ($K_f$), so that said feedback processing circuit operates according to the relation $K_f$.

14. The method of claim 11, wherein said step b) includes processing said feedback signal with a derivative gain ($K_d$) and a proportional gain ($K_f$), so that said feedback processing circuit operates according to the relation $K_f+K_dS$, wherein S comprises a Laplacian operator.

15. The method of claim 11, where said step c) includes the substeps of:
    ci) summing said processed feedback signal with a current reference signal in a summing circuit to produce a summed signal; and
    cii) applying said summed signal to a comparator which also receives an input of a triangle wave;
    ciii) comparing said summed signal to the triangle wave to produce a comparison output that is supplied to said power electronic converter.

16. A method for controlling power flow between a DC source and an AC utility source, said method comprising the steps of:
    a) receiving a feedback signal from a feedback node coupled between a passive filter and the AC utility source;
    b) processing said feedback signal in a feedback that applies a function $K_f+K_dS$ to produce a processed feedback signal, wherein ($K_f$) comprises a proportional gain, $K_d$ comprises a derivative gain, and S comprises a Laplacian operator;
    c) summing said processed feedback signal with a current reference signal in a summing circuit to produce a summed signal;
    d) applying said summed signal to a comparator that compares said summed signal to a triangle wave and produces a comparator output;
    e) applying the comparator output to a pulse-width modulated power electronic converter that produces a converter output; and
    f) applying the converter output to a passive filter to supply a utility current output.

17. A utility current feedback filter for use in a power flow control having an AC source of electrical energy and a DC source of electrical energy with a power converter coupled to the DC source, said filter comprising:
    a passive filter coupled between said power electronic converter and said AC source;
    for individual phases of the AC source
       a current feedback sensor positioned at a feedback node between said passive filter and said AC source to supply a feedback signal,
       a feedback circuit coupled to receive said feedback signal, said feedback circuit processing said feedback signal to supply a processed feedback signal, and a summing circuit coupled to receive said processed feedback signal and the current reference signal to produce a summed signal that controls said power electronic converter.

18. The filter of claim 17 wherein said pulse-width modulation system comprises:

a gain circuit coupled to receive said summed signal; and a comparator circuit coupled to receive the output of the gain circuit, said comparator also having an input receiving a triangle wave, to produce a comparison output that is supplied to said power electronic converter.

19. The filter of claim 17 wherein said feedback circuit processes said feedback signal with a derivative gain $K_d$, so that the feedback circuit processes the feedback signal in accordance with the relation $K_d S$, where S comprises a Laplacian operator.

20. The filter of claim 17 wherein said feedback circuit further processes said feedback signal with a proportional gain ($K_f$), so that the feedback circuit processes the feedback signal in accordance with the relation $K_f + K_d S$, where S comprises a Laplacian operator and $K_d$ comprises a derivative gain multiplier.

21. The filter of claim 17 wherein said passive filter comprises, for each phase:

a filter inductor coupled in series between said power electronic converter and said AC source.

22. The filter of claim 21 wherein said passive filter further comprises, for each phase:

a filter resistor coupled in series with a filter capacitor between a node defined between said power electronic converter and said filter inductor, and a common node.

* * * * *